United States Patent [19]

Langfeld et al.

[11] Patent Number: 5,026,830
[45] Date of Patent: Jun. 25, 1991

[54] PROCESS FOR THE PREPARATION OF AZO DYES BY CARRYING OUT COUPLING IN THE PRESENCE OF AN ALKALI METAL CHLORIDE AND AMMONIUM CHLORIDE

[75] Inventors: Horst Langfeld; Claudio Puebla, both of Grenzach-Wyhlen; Günter Sereinig, Schopfheim, all of Fed. Rep. of Germany

[73] Assignee: Ciba-Geigy Corporation, Ardsley, N.Y.

[21] Appl. No.: 237,474

[22] Filed: Aug. 29, 1988

[30] Foreign Application Priority Data

Sep. 8, 1987 [CH] Switzerland .................. 3447/87

[51] Int. Cl.$^5$ .................. C09B 29/02; C09B 41/00
[52] U.S. Cl. .................. 534/582; 534/583; 534/602; 534/728; 534/780; 534/841; 534/842; 534/883; 534/887
[58] Field of Search .............. 534/583, 780, 841, 842, 534/883, 582, 602

[56] References Cited

U.S. PATENT DOCUMENTS 2,812,321 11/1957 Eberhart et al. .............. 534/780 X
3,948,879 4/1976 Dore .................. 534/582

FOREIGN PATENT DOCUMENTS 187621 7/1986 European Pat. Off. ............ 534/583
3808817 9/1988 Fed. Rep. of Germany ...... 534/842
254550 11/1986 Japan .................. 534/842

OTHER PUBLICATIONS

Fierz-David, H. "Fundamental Processes of Dye Chemistry", Interscience Publishers, New York (1949) p. 251.
Zollinger, H., "Azo and Diazo Chemistry", Interscience Publishers New York, p. 250 (1961).
Franke et al., *Chemical Abstracts,* vol. 105, No. 228492j (1986).
Coloranti Azoici, Editura Technica Bucuresti (1981) pp. 330–331 (Floru et al.).

*Primary Examiner*—Mary C. Lee
*Assistant Examiner*—Fiona T. Powers
*Attorney, Agent, or Firm*—George R. Dohmann; Edward McC. Roberts

[57] ABSTRACT

Process for the preparation of azo dyes of the formula

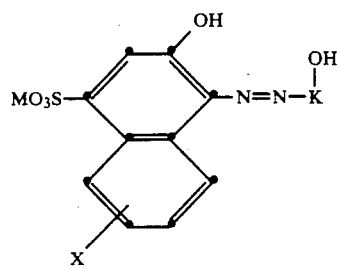

in which K is the radical of a coupling component of the benzene or naphthalene series or of the heterocyclic series in which the hydroxyl group is attached to K in a position adjacent to the azo group, X is hydrogen or nitro and M is an alkali metal ion or ammonium ion, which comprises coupling a diazo component of the formula

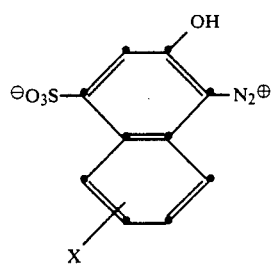

in the presence of an alkali metal chloride and ammonium chloride with a coupling component of the formula (3)

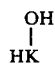

(3)

K and X in the formulae (2) and (3) being as defined under formula (1).

The present invention allows the preparation of the said azodyes in high yields.

15 Claims, No Drawings

PROCESS FOR THE PREPARATION OF AZO DYES BY CARRYING OUT COUPLING IN THE PRESENCE OF AN ALKALI METAL CHLORIDE AND AMMONIUM CHLORIDE

The coupling of 1-diazo-2-hydroxynaphthalene-4-sulfonic acid or of the corresponding component containing a nitro group with a coupling component of the benzene, naphthalene or heterocyclic series containing a hydroxyl group in the position adjacent to the coupling position proceeds slowly and with unsatisfactory yields in certain cases.

In recent years attempts have been made on an increasing scale to automatize and to optimize processes for the preparation of dyes and intermediate products thereof, not only in regard to the process of preparation, but also in respect of the working-up. In order to obtain satisfactory results in this field, one is dependent on processes which are characterized by the following criteria: the yields as quantitative as possible, with reproducibly good quality, reactions with as few working-up stages as possible and rapid reactions which make possible a large number of reactions per time unit.

The process, according to the invention, for the preparation of azo dyes of the formula

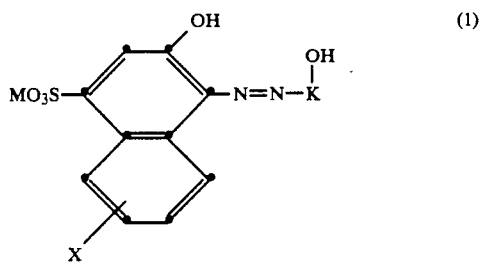

(1)

in which K is the radical of a coupling component of the benzene or naphthalene series or of the heterocyclic series in which the hydroxyl group is attached to K in the position adjacent to the azo group, X is hydrogen or nitro and M is an alkali metal ion or ammonium ion, comprises coupling a diazo component of the formula

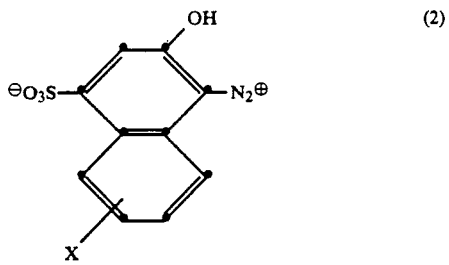

(2)

in the presence of an alkali metal chloride and ammonium chloride with a coupling component of the formula

(3)

K and X in the formulae (2) and (3) being as defined under formula (1).

The coupling of compounds of the formula (2) with compounds of the formula (3) is known to be difficult. Consequently, attempts have been made to improve the yield by using various catalysts, for example in the presence of zinc salts or in the presence of calcium or magnesium salts, or by coupling under an atmosphere of nitrogen. Zinc salts improve the yield, as also do calcium and magnesium salts; a disadvantage is the disturbance caused by the salt content after the reaction is complete, which generally requires intermediate precipitation of the azo dye formed. Working under an atmosphere of nitrogen requires special apparatus.

It is surprising that the process according to the invention produces a marked increase of yield in the coupling reaction in the presence of a mixture of alkali metal chloride and ammonium chloride, that the azo dyes obtained can be processed further directly without intermediate precipitation, and that the reaction is virtually complete even after a very short time. The very short reaction time should be singled out as an important characteristic of the process according to the invention. The reaction is complete even after a few minutes, as a rule after 5 to 10 minutes, which ensures a large conversion per time unit. Furthermore, no pollution of the effluent by heavy metal salts or sparingly soluble salts is caused by the procedure according to the invention.

Lithium chloride, sodium chloride or potassium chloride are advantageously used in the process according to the invention as the alkali metal chloride. In accordance with a preferred embodiment of the process according to the invention, sodium chloride is used as the alkali metal chloride.

The amount of alkali metal chloride and ammonium chloride which can be used in the process according to the invention can vary within wide limits; in general, a 15-molar amount of alkali metal chloride and ammonium chloride, particularly sodium chloride and ammonium chloride, relative to the molar amount of the diazo component of the formula (2), has proved advantageous.

A preferred embodiment of the process according to the invention comprises using an 8-molar to 10-molar amount of alkali metal chloride and ammonium chloride.

The ratio of alkali metal chloride to ammonium chloride can vary within wide limits; in general, a molar ratio of 5:1 to 15:1, i.e. 5 moles of alkali metal chloride to 1 mole of ammonium chloride to 15 moles of alkali metal chloride to 1 mole of ammonium chloride, has proved advantageous. A preferred embodiment of the process according to the invention comprises using a molar ratio of alkali metal chloride to ammonium chloride of 8:1 to 10:1.

The coupling reaction between the compound of the formula (2) and the compound of the formula (3) is carried out in aqueous solution. A value between 8.5 and 11.5 has proved a suitable pH for the coupling. The diazo component of the formula (2), which is present in an acid form, is advantageously first adjusted to a pH of approx. 7 with alkali metal hydroxide before the coupling and is only adjusted to the pH value between 8.5 and 11.5, in particular between 9 and 10, appropriate to the coupling immediately before coupling, it being advantageous to make this adjustment by means of ammonia or aqueous ammonia solution, for example a 10% to 30% aqueous solution; preferably the solution contains 22 to 28 percent by weight of ammonia.

A particularly preferred embodiment of the process according to the invention comprises adding alkali metal chloride and ammonium chloride, in particular a 5-molar to 15-molar amount, preferably an 8-molar to 10-molar amount, using a molar ratio of alkali metal chloride to ammonium chloride of 5:1 to 15:1, in particular 8:1 to 10:1, to the compound of the formula (2), neutralizing the solution and, immediately before coupling, adjusting the pH to a value between 8.5 and 11.5, in particular between 9 and 10, by means of ammonia or an aqueous solution of ammonia, and then running the mixture as rapidly as possible, at an initial temperature of at least 40° C., into the solution of the coupling component of the formula (3) which has been adjusted by means of alkali metal hydroxide to a pH between 9 and 13.

The molar ratio of the diazo component of the formula (2) to the coupling component of the formula (3) is 0.8:1.2 to 1.2:0.8, in particular 0.95:1.05 to 1.05:0.95.

Another preferred embodiment of the process according to the invention comprises carrying out coupling at a temperature of at least 40° C., in particular between 40° and 75° C. In particular, the coupling is carried out adiabatically, an initial temperature of at least 40° C. having proved especially advantageous.

A particularly important embodiment of the process according to the invention comprises coupling, in aqueous solution, a diazo component of the formula (2) in the presence of a 5-molar to 15-molar amount, relative to the molar amount of the diazo component, of an alkali metal chloride and ammonium chloride, at a pH adjusted by means of ammonia to between 8.5 and 11.5, in particular between 9.0 and 10.5, with a coupling component of the formula (3).

After the completion of coupling the azo dye of the formula (1) can, without further purification, be processed further directly, for example by metallization to give a metal complex dye. If the dye of the formula (1) is to be isolated, it has proved advantageous to heat the coupling composition briefly, for example to a temperature of 60° to 90° C., as a result of which a readily filterable form of the coupling product is obtained.

The diazo components of the formula (2) which can be employed by the process according to the invention are, in particular, 1-diazo-2-hydroxynaphthalene-4-sulfonic acid and 1-diazo-6-nitro-2-hydroxynaphthalene-4-sulfonic acid. The diazo components of the formula (2) are known and are prepared by known processes.

The coupling components of the formula (3) are known and are prepared by known processes. It is preferable to employ, in the process according to the invention, coupling components which belong to the benzene or naphthalene series or to the 5-pyrazolone, hydroxyquinoline or acetoacetoarylide or benzoylacetic acid series.

Apart from the hydroxyl group, the following substituents can also be present in the coupling components of the formula (3): $C_1$–$C_6$alkyl, $C_1$–$C_6$alkoxy, $C_2$–$C_6$alkanoylamino, $C_1$–$C_6$alkoxycarbonylamino, halogen, sulfo, sulfonamide and sulfone groups.

Examples of suitable $C_2$–$C_6$alkanoylamino groups are acetylamino, propionylamino and butyrylamino.

Examples of suitable $C_1$–$C_6$alkoxycarbonylamino groups are methoxycarbonylamino and ethoxycarbonylamino.

Examples of suitable $C_1$–$C_6$alkyl groups are methyl, ethyl, propyl, isopropyl, butyl, sec-butyl, tert-butyl, isobutyl, pentyl and hexyl.

Examples of suitable $C_1$–$C_6$alkoxy groups are methoxy, ethoxy, propoxy, isopropoxy and butoxy.

Examples of suitable halogens are fluorine, bromine and especially chlorine.

Examples of suitable sulfonamido groups are —$SO_2NH_2$ and $SO_2NHC_1$–$C_6$alkyl, for example —$SO_2NHCH_3$ and —$SO_2NHC_2H_5$ and —$SO_2N(C_1$–$C_6$alkyl$)_2$, for example —$SO_2N(CH_3)_2$ and —$SO_2N(C_2H_5)_2$) and also

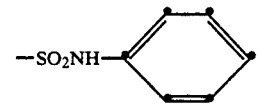

in which the phenyl radical can be substituted, for example by sulfo or carboxyl.

Examples of suitable sulfone groups are —$SO_2$—$C_1$–$C_6$alkyl, such as —$SO_2$—$CH_3$, and —$SO_2$aryl, such as phenylsulfonyl.

In a particularly preferred embodiment of the process according to the invention, use is made of coupling components of the formula (3) in which K is a benzene, naphthalene or 1-phenyl-3-methylpyrazol-5-one radical which can contain one to three of the substituents mentioned above; in particular K is the naphthyl radical.

An embodiment of the process according to the invention which is very particularly preferred comprises using, as the coupling component of the formula (3), 1-naphthol, 2-naphthol, 5,8-dichloro-1-naphthol, 1-naphthol-5-sulfonic acid, 8-acetylamino-2-naphthol, 6-acetylamino-2-naphthol-4-sulfonic acid, 1-phenyl-3-methylpyrazol-5-one, 6-amino-1-naphthol-3-sulfonic acid or 4-tert-butylphenol.

Coupling components which are particularly suitable are phenols which are substituted by $C_1$–$C_6$alkyl and/or $C_1$–$C_6$alkanoylamino, $C_1$–$C_6$alkoxycarbonylamino, and particularly naphthols which are unsubstituted or substituted by chlorine, $C_2$–$C_6$alkanoylamino, $C_1$–$C_6$alkoxycarbonylamino, sulfo, sulfonamide or sulfone groups, for example 4-methylphenol, 4-t-butylphenol, 2,4-dimethylphenol, 2-acetylamino-4-methylphenol, 1-naphthol, 2-naphthol, 1-naphthol-3-, -4- or -5-sulfonic acid, 2-naphthol-3-, -4-, -5-, -6-, -7- or -8-sulfonic acid, 2-naphthol-6-sulfamide, 1-acetylamino-7-naphthol, 1-acetylamino-6-naphthol, 1-propionylamino-7-naphthol, 1-carbomethoxyamino-7-naphthol, 5,8-dichloro-1-naphthol, 2-acetylamino-6-naphthol-8-sulfonic acid, 1-phenyl-3-methylpyrazol-5-one and 6-amino-1-naphthol-3-sulfonic acid.

A particularly interesting embodiment of the process according to the invention comprises adding an 8-molar to 10-molar amount of sodium chloride and ammonium chloride, the molar ratio of sodium chloride to ammonium chloride being 8:1 to 10:1, to 1-diazo-6-nitro-2-hydroxynaphthalene-4-sulfonic acid in aqueous solution, neutralizing the solution with NaOH and, immediately before coupling, adjusting the pH with aqueous ammonia solution to a value between 9 and 10, and then, as rapidly as possible, at an initial temperature of 40° C. running this solution into a solution of β-naphthol, the pH of which has been adjusted by means of alkali to a value between 11 and 13. The coupling takes place adiabatically and is complete after 5 to 10 minutes. The azo dye can be processed further directly without isolation or can be isolated by filtration after heating at 70° to 80° C. for a short period.

The azo dyes obtained by the process according to the invention are suitable for the preparation of metal complex dyes, for example chromium or cobalt complex azo dyes, the metallization being carried out by methods known per se.

In the following example parts are parts by weight. The temperatures are degrees centigrade. The relationship between parts by weight and parts by volume is the same as that between grams and cubic centimeters.

EXAMPLE 1

3 parts of ammonium chloride and 14.75 parts of 1-diazo-6-nitro-2-hydroxynaphthalene-4-sulfonic acid are introduced into 150 parts of water. 20 parts of sodium chloride are then added and the pH is adjusted to the neutral point by means of an aqueous solution of NaOH (50%). In the course of this the temperature rises to approx. 42°. 6 parts of a 25% aqueous ammonia solution are then added, followed immediately by a solution prepared as follows: 7.5 parts of 2-naphthol are introduced into 50 parts of water heated to 60° and are dissolved by means of 2.5 parts of NaOH, in the course of which a pH of approx. 12 is set up, and 7.5 parts of sodium chloride are then added. The reaction mixture is immediately stirred vigorously, in the course of which a temperature of approx. 50° is set up and the pH falls to a value between 9.3 and 9.5. Coupling is complete after 5 to 10 minutes. The pH of the coupling product is adjusted to a value of 7 with 32% hydrochloric acid and it is filtered off at 80°. The yield is approx. 92% of theory.

If an equimolar amount of 1-diazo-2-hydroxynaphthalene-4-sulfonic acid is used instead of 1-diazo-6-nitro-2-hydroxynaphthalene-4-sulfonic acid, a dye is obtained at a similarly high yield in a comparably short dwell time in the coupling kettle.

The resulting dyes can be processed further to give the metal complex directly, without intermediate precipitation or without purification, i.e. the adjustment of the pH to the neutral point, heating to 80° and filtration are superfluous.

EXAMPLE 2

2.5 parts of ammonium chloride and 14.75 parts of 1-diazo-6-nitro-2-hydroxynaphthlene-4-sulfonic acid are introduced into 150 parts of water. 24 parts of sodium chloride are then added and the pH is adjusted to the neutral point by means of a 50% aqueous solution of NaOH. In the course of this the temperature rises to approx. 42°. 6 parts of a 25% aqueous ammonia solution are then added, followed immediately by a solution prepared as follows: 7.5 parts of 2-naphthol are introduced into 50 parts of water heated to 60° and are dissolved by means of 2.5 parts of NaOH, in the course of which a pH of approx. 12 is set up, and 10 parts of sodium chloride are then added. The reaction mixture is immediately stirred vigorously, a temperature of approx. 65° is set up and the pH is adjusted to a value between 8.6 and 9.0. Coupling is complete after 5 to 10 minutes. The pH of the coupling product is adjusted to a value of 7 with 32% hydrochloric acid and it is filtered off at 80°. The yield is approx. 92% of theory.

EXAMPLE 3

2.65 parts of ammonium chloride and 14.75 parts of 1-diazo-6-nitro-2-hydroxynaphthalene-4-sulfonic acid are introduced into 150 parts of water. 14 parts of sodium chloride are then added and the pH is adjusted to the neutral point by means of a 50% aqueous solution of NaOH. In the course of this the temperature rises to approx. 42°. 6 parts of a 25% aqueous solution of ammonia are then added, followed immediately by a solution prepared as follows: 7.5 parts of 2-naphthol are introduced into 50 parts of water heated to 60° and are dissolved by means of 2.5 parts of NaOH, in the course of which a pH of approx. 12 is set up, and 1.95 parts of sodium chloride are then added. The reaction mixture is immediately stirred vigorously, a temperature of approx. 42° is set up and the pH is adjusted to a value between 10.3 and 10.6. Coupling is complete after 5 to 10 minutes. The pH of the coupling product is adjusted to a value of 7 with 32% hydrochloric acid and it is filtered off at 80°. The yield is approx. 92% of theory.

EXAMPLE 4

1.8 parts of ammonium chloride and 14.75 parts of 1-diazo-6-nitro-2-hydroxynaphthalene-4-sulfonic acid are introduced into 150 parts of water. 20 parts of sodium chloride are then added and the pH is adjusted to the neutral point by means of a 50% aqueous solution of NaOH. In the course of this the temperature rises to approx. 42°. 6 parts of a 25% aqueous solution of ammonia are then added, followed immediately by a solution prepared as follows: 7.5 parts of 2-naphthol are introduced into 50 parts of water heated to 60° and are dissolved by means of 2.5 parts of NaOH, in the course of which a pH of approx. 12 is set up, and 7.5 parts of sodium chloride are then added. The reaction mixture is immediately stirred thoroughly, a temperature of approx. 55° is set up and the pH is adjusted to a value between 9.1 and 9.3. Coupling is complete after 5 to 10 minutes. The pH of the coupling product is adjusted to 7 with 32% hydrochloric acid and it is filtered off at 80°. The yield is approx. 92% of theory.

If the procedure indicated in Examples 1 to 4 is repeated, except that an equimolar amount of the diazo components indicated in column 2 of the following table is used as the diazo component and an equimolar amount of the coupling components indicated in column 3 of the following table is used instead of the coupling component, with an otherwise similar procedure, high yields of monoazo dyes are obtained which can be processed further to give the metal complex directly without intermediate precipitation or without purification.

TABLE

| Example | Diazo component | Coupling component |
|---|---|---|
| 5 | $^\ominus O_3S$—[naphthalene with OH]—$N_2^\oplus$ | [naphthalene with OH] |

TABLE-continued
| Example | Diazo component | Coupling component |
|---|---|---|
| 6 | 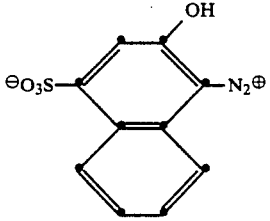 | 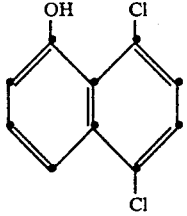 |
| 7 | 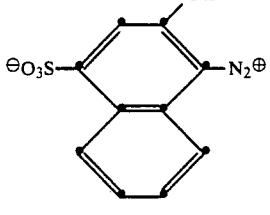 | 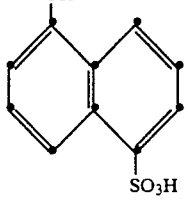 |
| 8 | 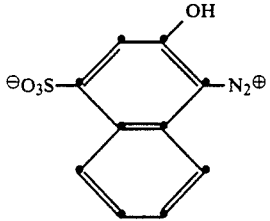 | 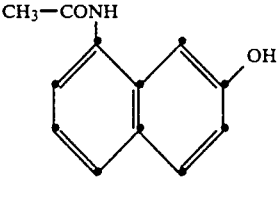 |
| 9 | 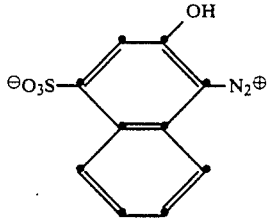 | 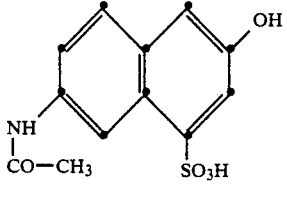 |
| 10 | 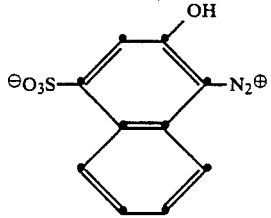 | 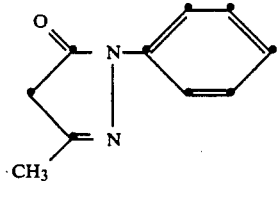 |
| 11 | 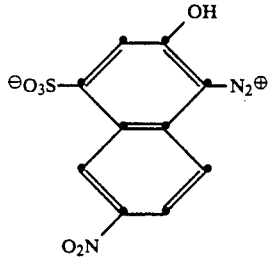 | 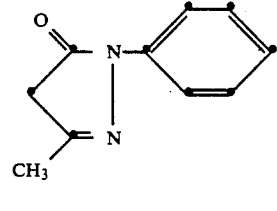 |

TABLE-continued

| Example | Diazo component | Coupling component |
|---|---|---|
| 12 | 3-diazo-2-hydroxy-6-nitronaphthalene-5-sulfonate | naphthalen-1-ol |
| 13 | 3-diazo-2-hydroxy-6-nitronaphthalene-5-sulfonate | 4,5-dichloronaphthalen-1-ol |
| 14 | 3-diazo-2-hydroxy-6-nitronaphthalene-5-sulfonate | 8-hydroxynaphthalene-1-sulfonic acid |
| 15 | 3-diazo-2-hydroxy-6-nitronaphthalene-5-sulfonate | 1-acetamido-7-hydroxynaphthalene |
| 16 | 3-diazo-2-hydroxy-6-nitronaphthalene-5-sulfonate | 2-acetamido-6-hydroxynaphthalene-4-sulfonic acid |
| 17 | 3-diazo-2-hydroxynaphthalene-5-sulfonate | 6-amino-1-hydroxy-3-sulfonaphthalene |

TABLE-continued

| Example | Diazo component | Coupling component |
|---|---|---|
| 18 | | |
| 19 | | |
| 20 | | |

The resulting dyes can be processed to give the metal complex directly without intermediate precipitation or without purification, i.e. the adjustment of pH to the neutral point, heating to 80° and filtration are superfluous.

What is claimed is:

1. A process for the preparation of azo dyes of the formula

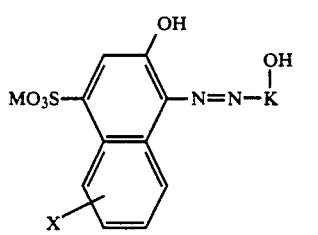

in which K is benzene, naphthalene or heterocyclic radical in which the hydroxyl group is attached to K in a position adjacent to the azo group, X is hydrogen or nitro and M is an alkali metal ion or ammonium ion consisting essentially of coupling a diazo component of the formula

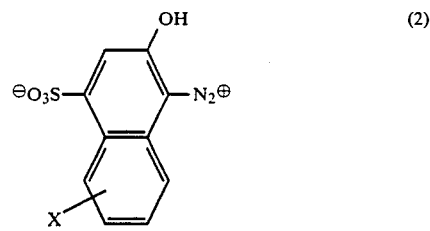

in the presence of 5-molar to 15-molar amount of an alkali metal chloride and ammonium chloride, relative to the molar amount of the diazo component of the formula (2), with a coupling component of the formula (3)

K and X in the formulae (2) and (3) being as defined under formula (1).

2. A process according to claim 1, wherein coupling is carried out in the presence of sodium chloride and ammonium chloride.

3. A process according to claim 1, wherein coupling is carried out in the presence of an 8-molar to 10-molar amount of an alkali metal chloride and ammonium chloride, relative to the molar amount of the diazo component of the formula (2).

4. A process according to claim 1, wherein the molar ratio of alkali metal chloride to ammonium chloride is 5:1 to 15:1.

5. A process of claim 4, wherein the molar ratio of alkali metal chloride to ammonium chloride of 8:1 to 10:1.

6. A process according to claim 1, wherein the pH is adjusted to a value between 8.5 and 11.5 immediately before the coupling of the solution/suspension containing the diazo component and an alkali metal chloride and ammonium chloride.

7. A process according to claim 6, wherein the pH is adjusted with aqueous ammonia solution.

8. A process according to claim 1, wherein coupling is carried out adiabatically.

9. A process according to claim 1, wherein coupling is carried out at a temperature between 40° and 75° C.

10. A process according to claim 1, wherein a diazo component of the formula (2) is coupled, in aqueous solution and in the presence of a 5-molar to 15-molar amount, relative to the molar amount of the diazo component, of an alkali metal chloride and ammonium chloride, at a pH adjusted by means of ammonia to a value between 8.5 and 11.5, with a coupling component of the formula (3).

11. A process of claim 10 wherein the pH is adjusted to a value between 9.0 and 10.5.

12. A process according to claim 1, wherein a coupling component of the formula (3) in which K is a benzene, naphthalene, 5-pyrazolone, hydroxyquinoline, acetoacetarylide or benzoylacetic acid series is used.

13. A process according to claim 12, wherein K is a benzene, naphthalene or 5-pyrazolone radical which is unsubstituted or substituted by $C_1$-$C_6$alkyl, $C_1$-$C_6$alkoxy, $C_2$-$C_6$alkanoylamino, C-$C_6$alkoxycarbonylamino, halogen, sulfo and sulfonamide and sulfone groups.

14. A process according to claim 12, wherein the coupling component of the formula (3) used is 1-naphthol, 2-naphthol, 5,8-dichloro-1-naphthol, 1-naphthol-5-sulfonic acid, 8-acetylamino-2-naphthol, 6-acetylamino-2-naphthol-4-sulfonic acid, 1-phenyl-3-methylpyrazol-5-one, 6-amino-1-naphthol-3-sulfonic acid or 4-tert-butylphenol.

15. A process according to claim 14, wherein a coupling component of the formula (3) wherein K is the naphthyl radical is used.

* * * * *